(12) United States Patent
Cohen

(10) Patent No.: US 10,258,125 B1
(45) Date of Patent: Apr. 16, 2019

(54) ANIMAL RESISTANT FOOD BAG WITH INTEGRATED ENCLOSURE SYSTEM

(71) Applicant: Thomas A Cohen, Mill Valley, CA (US)

(72) Inventor: Thomas A Cohen, Mill Valley, CA (US)

(73) Assignee: BEAR SAGA LLC, Westlake, OH (US)

( * ) Notice: Subject to any disclaimer, the term of this patent is extended or adjusted under 35 U.S.C. 154(b) by 75 days.

(21) Appl. No.: 15/595,031

(22) Filed: May 15, 2017

(51) Int. Cl.
| | | |
|---|---|---|
| *B65D 33/28* | (2006.01) | |
| *A45C 11/20* | (2006.01) | |
| *B32B 5/02* | (2006.01) | |
| *B32B 37/06* | (2006.01) | |
| *B65D 33/16* | (2006.01) | |
| *A45F 3/00* | (2006.01) | |

(52) U.S. Cl.
CPC .............. *A45C 11/20* (2013.01); *B32B 5/024* (2013.01); *B32B 37/06* (2013.01); *B65D 33/16* (2013.01); *B65D 33/28* (2013.01); *A45F 3/00* (2013.01); *B32B 5/02* (2013.01); *B32B 2250/03* (2013.01); *B32B 2307/58* (2013.01); *B32B 2307/581* (2013.01); *B32B 2307/584* (2013.01); *B32B 2309/02* (2013.01); *B32B 2309/04* (2013.01); *B32B 2439/46* (2013.01)

(58) Field of Classification Search
CPC ....... A45C 11/20; A45C 13/18; A45C 13/185; A45C 11/22; A45C 11/26; A45C 2013/1015; B65D 33/16; B65D 33/28

USPC ................ 383/61-64, 93-95, 71-77, 42, 97; 150/102

See application file for complete search history.

(56) References Cited

U.S. PATENT DOCUMENTS

| | | | | |
|---|---|---|---|---|
| 188,673 | A | * 3/1877 | Redden | ................... B65D 29/00 383/61.5 |
| 3,369,584 | A | * 2/1968 | Faccio | ................... D06F 95/004 383/61.4 |
| 3,998,304 | A | * 12/1976 | Edgerton, Jr. | ........... A45C 3/00 190/107 |
| 4,819,458 | A | 11/1989 | Kavesh et al. | |
| 4,897,902 | A | 2/1990 | Kavesh et al. | |
| 6,332,713 | B1 | 12/2001 | Cohen | |

(Continued)

*Primary Examiner* — Jes F Pascua
*Assistant Examiner* — Nina K Attel
(74) *Attorney, Agent, or Firm* — Steven A. Nielsen; www.NielsenPatents.com

(57) ABSTRACT

An animal resistant bear bag (100) is comprised of a laminate (400) configuration comprised of specially formulated ballistic grade Spectra fabric (200), EVA (300), ethylene vinyl acetate and specially formulated Kevlar correctional grade fabric. The lamination process may involve various temperature ranges and various rolling and/or compression techniques. A bear and critter bag may contain food intended for human consumption and is designed and constructed to prevent bears and other animals from accessing, eating or otherwise absconding with the contained food. Animal resistance is enhanced by the use of use of four or so Spectra thread seams and the use of specially constructed cord. A uniquely designed access and closure system allows humans quick access to bag contents while solving the problem of using laminate that is too rigid to cinch closed with traditional systems. An exterior closing sleeve (500) may extend beyond the main bag assembly (600).

5 Claims, 6 Drawing Sheets

(56) References Cited

U.S. PATENT DOCUMENTS

| | | |
|---|---|---|
| 6,818,091 B1 | 11/2004 | Holland et al. |
| 8,146,769 B2 | 4/2012 | Hogan |
| 2008/0202975 A1 | 8/2008 | Vance |
| 2009/0190865 A1* | 7/2009 | Chang .................. A45C 3/001 383/110 |
| 2010/0068963 A1* | 3/2010 | Holland ............. A41D 31/0061 442/288 |
| 2016/0046441 A1* | 2/2016 | Holland ............... B65D 88/127 220/1.5 |

* cited by examiner

ANIMAL RESISTANT FOOD BAG WITH INTEGRATED ENCLOSURE SYSTEM

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to animal resistant containers. More particularly, the invention relates to the use of specialized lamination systems and closure systems to construct flexible containers that are resistant to bears, smaller animals and moisture intrusion.

(2) Description of the Related Art

U.S. Pat. No. 6,332,713 by Cohen discloses a superior bear proof, lightweight food sack, but fails to accommodate the use of relatively stiff bag laminates that are difficult to close with traditional cinch systems.

U.S. Pat. No. 6,818,091 by Holland et al discloses a process for pressing a puncture resistant laminate fabric. But, the Holland fabric fails to exhibit sufficient tear resistance to be of use in bear bag applications.

In the related art, general bear bags and bear cans are known, but have various shortfalls. Bear cans are of fixed size and are not well suited for backpacking. Bear bags of the related art have advanced over the years, but still fail to prevent smaller animals, sometime referred to as "critters" from accessing the contents of a bag. The prior art does present bags resistant to smaller animals and rodents, but such bags fail to be bear resistant.

Bear bags of the related art have failed to incorporate closure systems suitable for thicker and/or stiffer materials. Many bear bags of the related art fail to keep water or moisture from fouling the contained food. Thus, there is a need and room in the art for the presently disclosed embodiments.

BRIEF SUMMARY OF THE INVENTION

The presently disclosed embodiments overcome shortfalls in the related art by presenting an unobvious and unique combination, configuration and use of fabrics and other materials to create a new laminate that is resistant to both bears and smaller animals. The presently disclosed embodiments also overcome shortfalls in the art by use of a new integrated closure system that accommodates the use of fabric or laminates that are too stiff for use with traditional cinch or closure systems.

The presently disclosed embodiments overcome shortfalls in the art by being resistant to both bears and smaller animals.

The known related art fails to disclose, suggest or teach the use of the disclosed laminate systems that provide new and unique material properties that are exceptionally well suited for animal and moisture resistant food containers.

Disclosed embodiments overcome shortfalls in the art by presenting animal resistant bags that are highly resistant to punctures, weave separations, moisture transfer and are well suited for backpacking.

Disclosed containers may be constructed of a laminate system comprised of specially formulated ballistic grade Spectra fabric, EVA (ethylene vinyl acetate) and specially formulated Kevlar correctional grade fabric. The lamination process may involve various temperature ranges and several rolling and/or compression techniques. Animal resistance is enhanced by the use of use of four or so Spectra threaded seams and by the use of specially constructed cord. A uniquely designed access and closure system allows humans quick access to bag contents while solving the problem of using laminate that is too rigid to cinch closed with traditional closure systems. A more flexible exterior closing sleeve solves problems in the prior art by complementing and being integrated with a fairly inflexible main bag assembly. A main bay assembly may be made of the disclosed three layer fabric system while an exterior closing sleeve or top sleeve may be made of a subset of the disclosed three layer fabric system. Disclosed embodiments include the use of an exterior top sleeve system that creates part of the closing assembly.

The main bag assembly may include internal closure systems that close or fasten the stiffer laminate used for the main compartment. The stiffer main bag assembly may comprise two pieces of main bag laminate wherein a top sections or interior closure flaps lay in a flat position during construction and use. The persistent flat positioning of the interior closure flaps accommodate the use of the new stiffer main bag laminate and the use of a hook and loop system to securely close or secure the interior closure flaps. In order to obtain a finished cylindrically shaped form factor, a relatively thinner exterior closing sleeve is attached over the interior closure flaps and the exterior closing sleeve comports to the round shape of a filled main bag assembly. A round form factor presents a more difficult challenge to a bear attempting to claw or grasp a container.

Disclosed embodiments include bear bags designed to contain food intended for human consumption, the bear bags having the ability to prevent bears and other animals from accessing, eating or otherwise fouling the contained food and to protect the contained food from outside water or moisture.

Figure 1:
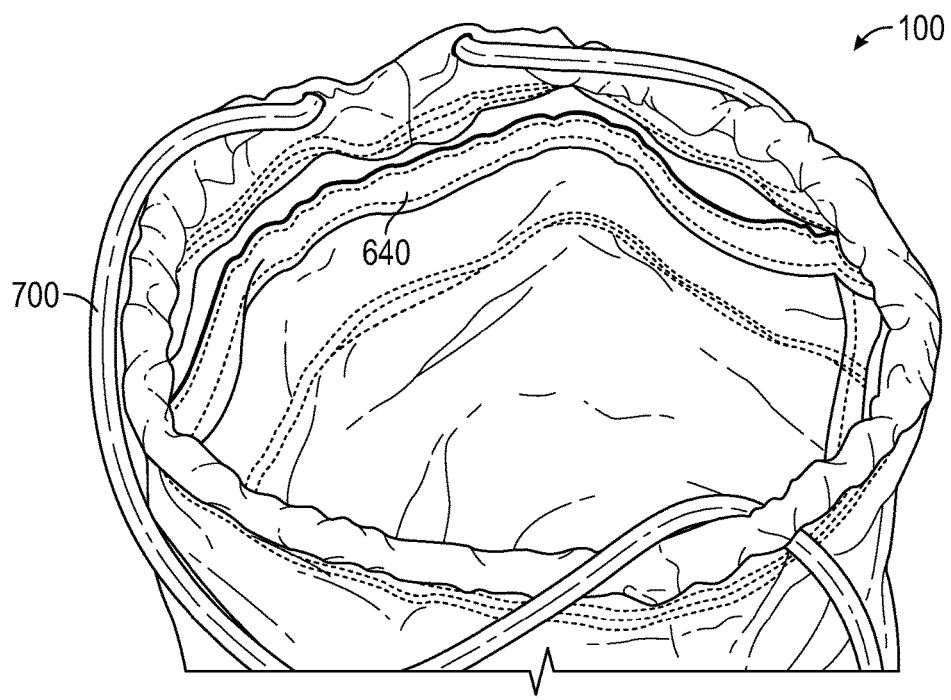
FIG. 1 depicts a perspective view of top portions of a disclosed embodiment

REFERENCE NUMERALS IN THE DRAWINGS 100 animal and moisture resistant bear bag
200 Spectra fabric or ultra-high molecular weight polyethylene
300 EVA or ethylene vinyl acetate
350 Kevlar correctional grade fabric or fabric made from aramid fibers or aromatic polyamides
400 main bag laminate
500 exterior closing sleeve
510 cinch void defined within exterior closing sleeve 700
515 cinch void seam
600 main bag assembly
605 side seam of main bag assembly
610 gusset assembly of main bag assembly 600
620 neck seam of main bag assembly for attachment of the exterior closing sleeve to the main bag assembly 600
623 smooth exterior fold at opposite side of interior neck seam 620
640 hook and loop system disposed upon interior closure flaps 650
650 interior closure flaps of main bag assembly
700 cord system
800 bear These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

In general, and referring to all of the drawings, a disclosed food container or bear bag 100 may comprise a main bag assembly 600, with the main bag assembly having an outer side, interior side, inferior side and a superior side. The inferior side may define or comprise a gusset assembly 610. A main bag assembly 600 may comprise longitudinal side seams 605 which may be disposed within the bag or upon the interior side of the bag. The longitudinal side seams 605 may comprise three or more seams. The longitudinal side seams 605 may run the entire length of the main bag assembly and the longitudinal side seams may cross the neck seam 620 and extend into the interior closure flap section 650 of the main bag assembly. The interior closure flaps 650 or interior closure flap section of the main bag assembly may comprise the same structure as the main bag assembly, being of the same main bag laminate 400.

Top or superior portions of the interior closure flaps 650 may comprise hook and loop fastening to provide secure closure to the main bag assembly. Thus, the disclosed embodiments overcome shortfalls in the art by providing an enclosure made from a relatively stiff or inflexible main bag laminate 400 such that the stiff main bag laminate may be closed in a flat position by use of the hook and loop system. By use of the longitudinal side seams 605 fastening two flat pieces of main bag laminate, very stiff material may be used to form a relatively flat and rectangular shaped main bag assembly 600 which is conducive to use of the hook and loop system 640 to close the main bag assembly. In the prior art, thinner, weaker or more flexible main bag material was used, as the prior art designs used a cord system at the top of the main bag. The effective use of a cord closure system requires material attached to the cord system to be thin or flexible so that the cord system can cinch or circularly close the top of the bag. This shortfall in the prior art is overcome by the disclosed exterior closing sleeve 500 that attaches at the neck seam 620 of the main bag assembly. The exterior closing sleeve may cinch is a circular manner.

Mechanical advantage and greater animal resistance is obtained by the artful placement of the neck seam 620, in that the neck seam is applied while the exterior closing sleeve is flat with the interior side of the closing sleeve facing outwardly. Upon attaching the neck seam 620, the exterior closing sleeve is rolled upwardly such that no exterior stitching is presented. The top or superior portions of the exterior closing sleeve 500 may be folded to define or form a cinch void 510 with the cinch void sometimes containing a cord or cord system 700. With the exterior closing sleeve being made from relatively more flexible material as compared to the main bag laminate 400, the exterior closing sleeve overcomes shortfalls in the art by being capable of forming a circular closure by a closing action or cinching action executed by the cord or cord system 700. The circular closure of the exterior closing sleeve 500 creates a circular shape that will comport to a circular shape created in the lower portions of the main bag assembly with such circular shape occurring when food is placed in the main bag assembly. Thus, with food is stored in the main bag assembly, the flat two pieces of main bag laminate become round at the bottom or mid portions while the top portion or interior closure flap section 650 of the main bag assembly stays flat, to facilitate effective closure using the hook and loop system. Thus, the use of the flexible exterior closing sleeve protects the flat top closure of the main bag assembly and presents a rounded external top portion to match the exterior form of a bag in use, thus presenting a uniformly round object to a bear, not giving a bear a flat area to grasp or to press against a tree for a more secure grip or purchase of the bag. The construction of the neck seam 620 in integral in producing the mechanical advantages of the exterior closing Presenting a bag or container that is of relatively uniform in cylindrical shape is more effective in being bear resistant as the bag tends to roll when pressed upon a tree or hit or clawed.

The presently disclosed embodiments overcome shortfalls in the art by making and use of a main bag laminate 400, the main bag laminate may be comprised of three or more layers with the layers comprising spectra fabric 200, ethylene vinyl acetate or "EVA" 300 and Kevlar correctional grade fabric 350. The three layers may be baked at temperatures in the range of 260 to 320 degrees and for a time period in the range of ten to fourteen hours. A main bag laminate 400 may comprise a layer of Spectra 200 on the outside, a layer of EVA 300 in the middle and a layer of Kevlar correctional grade fabric 350 on the inside. The artful combination of materials that may comprise the main bag laminate produce unexpectedly excellent results in bear resistance testing. Disclosed embodiments have passed every standardized bear bag test but yet are lighter than the prior art bags, making the disclosed embodiments well suited for backpacking.

The exterior closing sleeve 500 may be made of Spectra or similar material such as ultra-high molecular weight polyethylene.

Referring to FIG. 1, an animal and moisture resistant bag 100 is shown with a cord system 700, the cord system sometimes used to cinch or secure the exterior closing sleeve 500. Disclosed embodiments are sometimes referred to as a "bag", "bear bag", "outdoor food container" or "bear resistant bag." A hook and loop or other fastener system may be found upon an interior closure flap.

Figure 2:
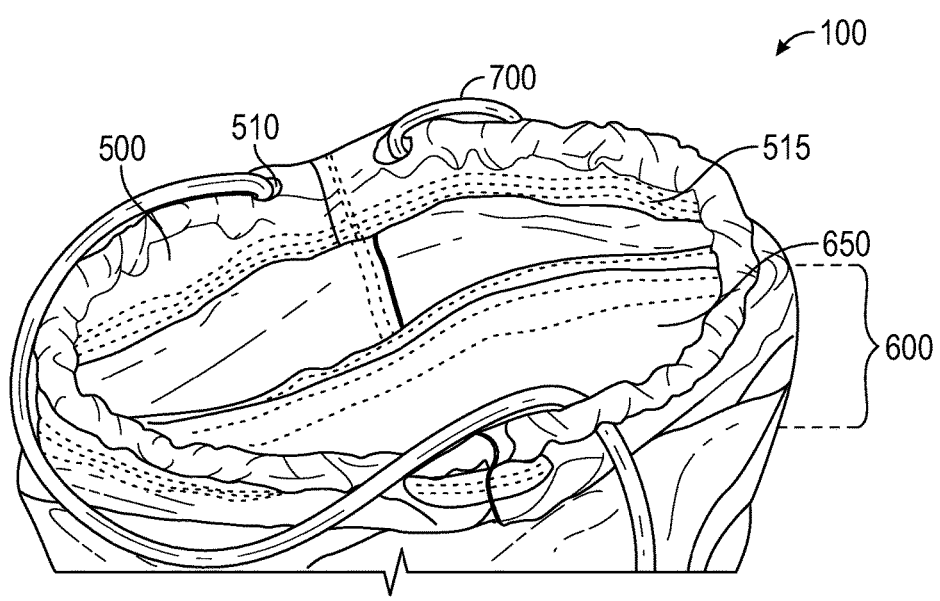
FIG. 2 depicts a perspective view of top portions of a disclosed embodiment

Referring to FIG. 2, top portions of an embodiment 100 are shown having an exterior closing sleeve 500, the exterior closing sleeve having an inferior side or bottom side attached to the main bag assembly 600. The exterior closing sleeve may have a superior side defining a loop void, the loop void 510 sometimes containing a cord system 700. A main bag assembly 600, when in use, may take the rough form of a fabric cylinder and may have an exterior side and an interior side, with the upper or superior area forming or being used to create an interior flap 650 or a pair of interior flaps. The top or superior side of each inner flap may comprise means of attachment such as a hook and loop system, snaps, drawstrings, buckles and other fasteners.

Figure 3:
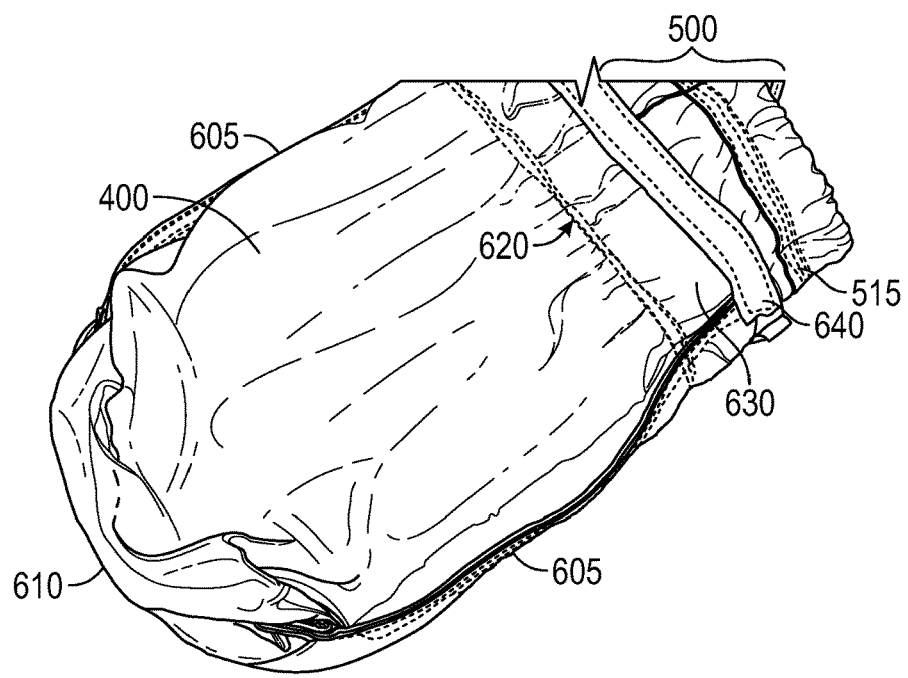
FIG. 3 depicts a perspective view of disclosed embodiment in an inside out position

Referring to FIG. 3, one sheet or piece of main bag laminate 400 is disposed on top of another piece of main bag laminate with the two pieces attached to each other by means of a longitudinal side seam 605 running the length of the main bag assembly. The side seam 605 may cross the neck seam 620, with the side seam 605 continuing from the neck seam 620 to the upper or superior end of the main bag assembly. In FIG. 3 the bag is turned inside out, and the top end of the main bag assembly is found at the hook and loop system 400.

The disclosed two piece construction of the main bag assembly overcomes shortfalls in the related art in that the top end of the main bag assembly, the interior closure flaps, lay flat, even while the bag is in use, such that a hook and loop system may effectively close the bag. Below the neck seam 620, the bag may open as food is stored inside, and the gusset assembly 610 allows the bottom portions of the bag to expand into a cylindrical shape, providing the best form factor for bear resistance.

In FIG. 3, the upper right hand side of the drawing depicts an exterior closing sleeve 500. The top portion of the exterior closing sleeve forms a cinch void by folding back, with the end of the sleeve attached below the top of the finished sleeve, with the attachment point occurring or secured by or at a cinch void seam 515.

Figure 4:
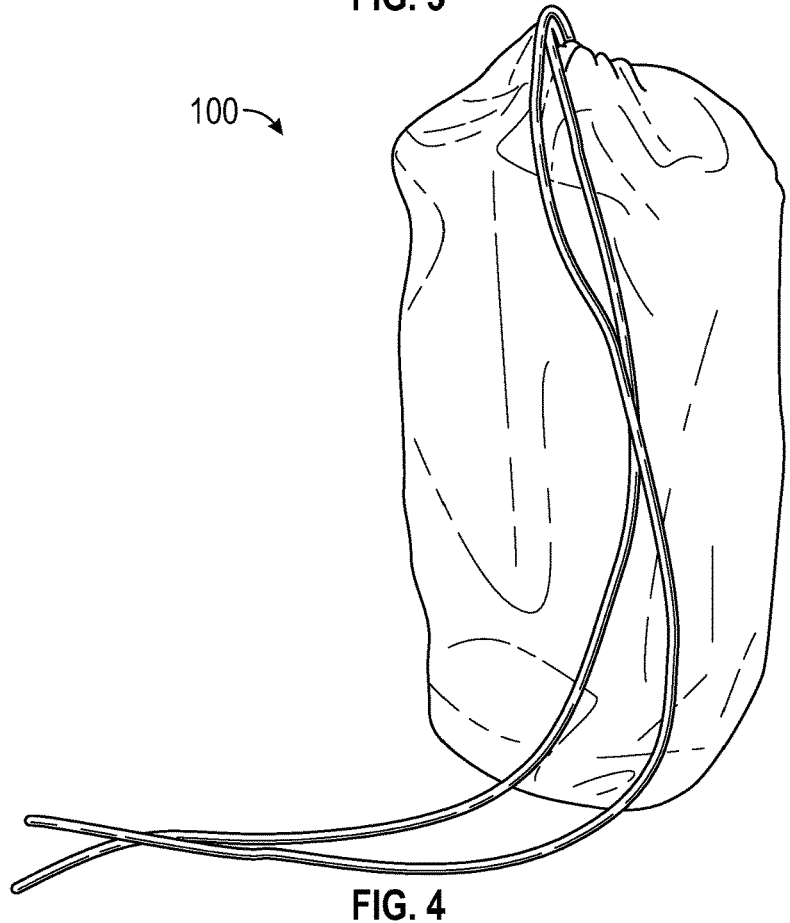
FIG. 4 depicts a perspective view of a disclosed embodiment

Referring to FIG. 4, a perspective and exterior view of a closed but yet filled bag is depicted. The outward cylinder form factor is made possible by, inter alia, the more flexible exterior closing sleeve encasing the flatly secured interior closure flaps. The round form factor keeps the bag spinning when attacked by a bear and the round exterior form factor is more difficult for a bear to claw or grasp. The use of a cord or cord system 700 also aids in making the bag more bear resistant as the bag will move and swing when suspended, with such movement thwarting a bear's firm purchase upon the bag.

Figure 5:
FIG. 5 depicts a perspective view of disclosed embodiment in use

Referring to FIG. 5, a bear is attempting to obtain food stored in a disclosed bag 100. The round shape of the bag prevents the bear from trapping the bag between the tree and the bear's paw. The top part of the bag depicts the cinched and circular nature of the exterior closing sleeve in a closed position. The narrow top section or exterior closing sleeve of the closed bag further protects the closure of the two interior closure flaps.

Figure 6:
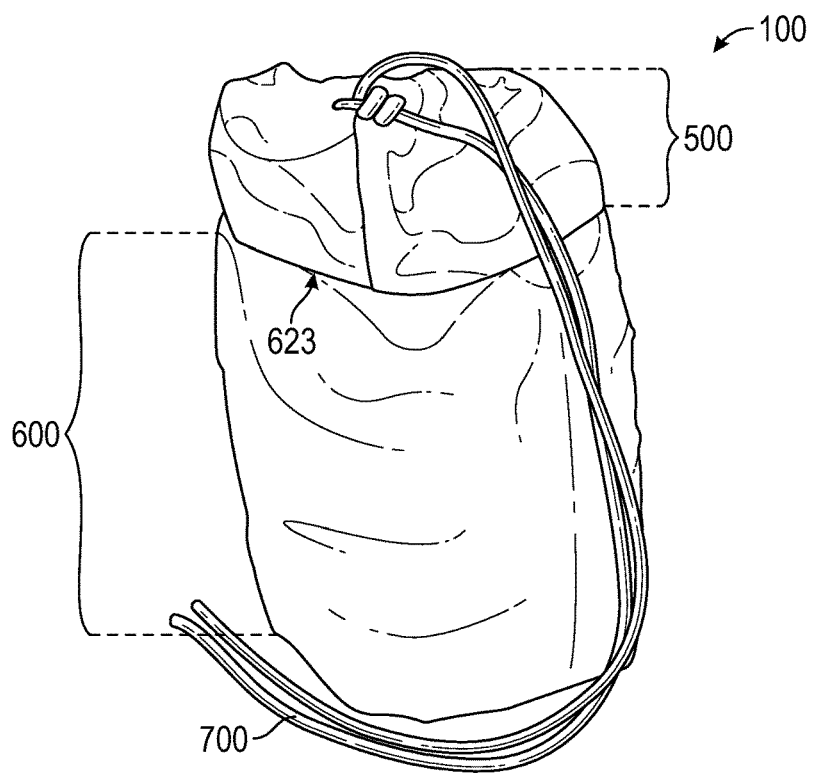
FIG. 6 depicts a perspective view of a disclosed embodiment

FIG. 6 depicts a perspective and exterior view of a bag 100 in a closed position. An exterior closing sleeve is depicted at the top of the bag. The exterior transition between the main bag assembly 600 and exterior closing sleeve 500 can be seen at the smooth exterior fold 623 at the attachment point of the exterior closing sleeve and main bag assembly. The smooth exterior fold or smooth exterior transition fold 623 overcomes shortfalls in the art by providing minimal holding, clawing or grasping surfaces for a bear. The smooth exterior transitional fold 623 is made possible by the artful inside seaming structure and technique of the neck seam.

Figure 7:
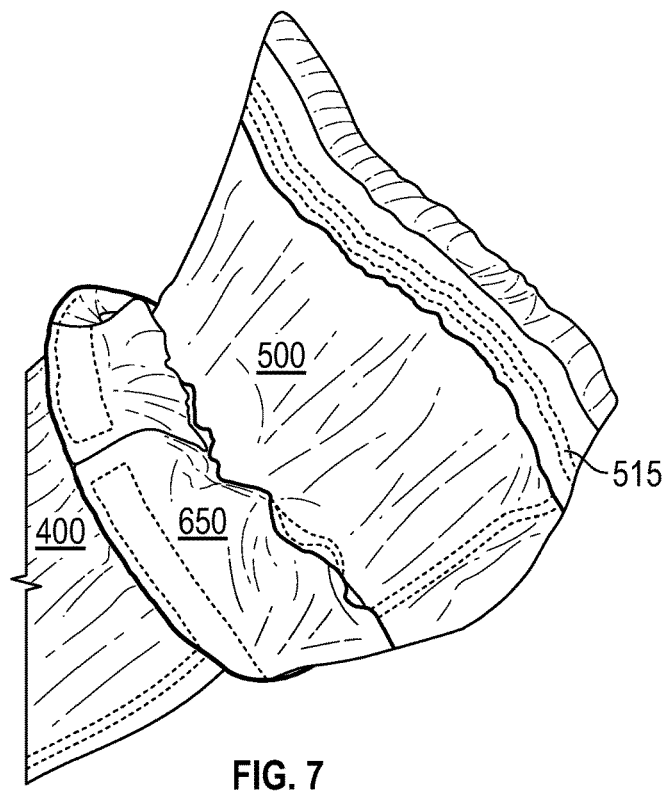
FIG. 7 depicts a perspective view of disclosed embodiment in an inside out position

FIG. 7 depicts a bag in an inside out position; on the left had side, depicting inside portions of an interior closure flap 650; and on the right hand side, depicting inside portions of an exterior closing sleeve 500.

Figure 8:
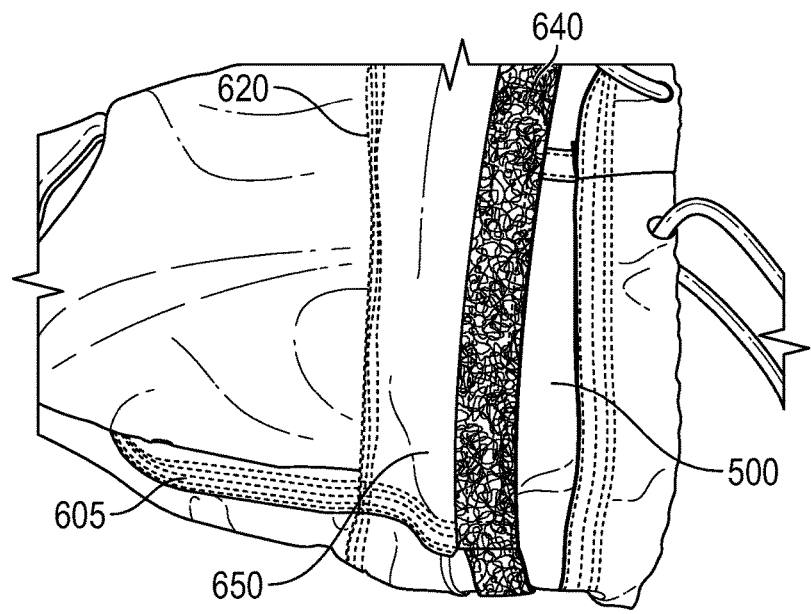
FIG. 8 depicts a disclosed embodiment in an inside out position

FIG. 8 depicts a perspective view of a bag in an inside out position. An exterior closing sleeve 500 may be attached to a main bag assembly by use of a neck seam 620. The main bag fabric or main bag assembly between the neck seam 620 and the hook and loop system 640 may comprise a interior enclosure flap 650.

Figure 9:
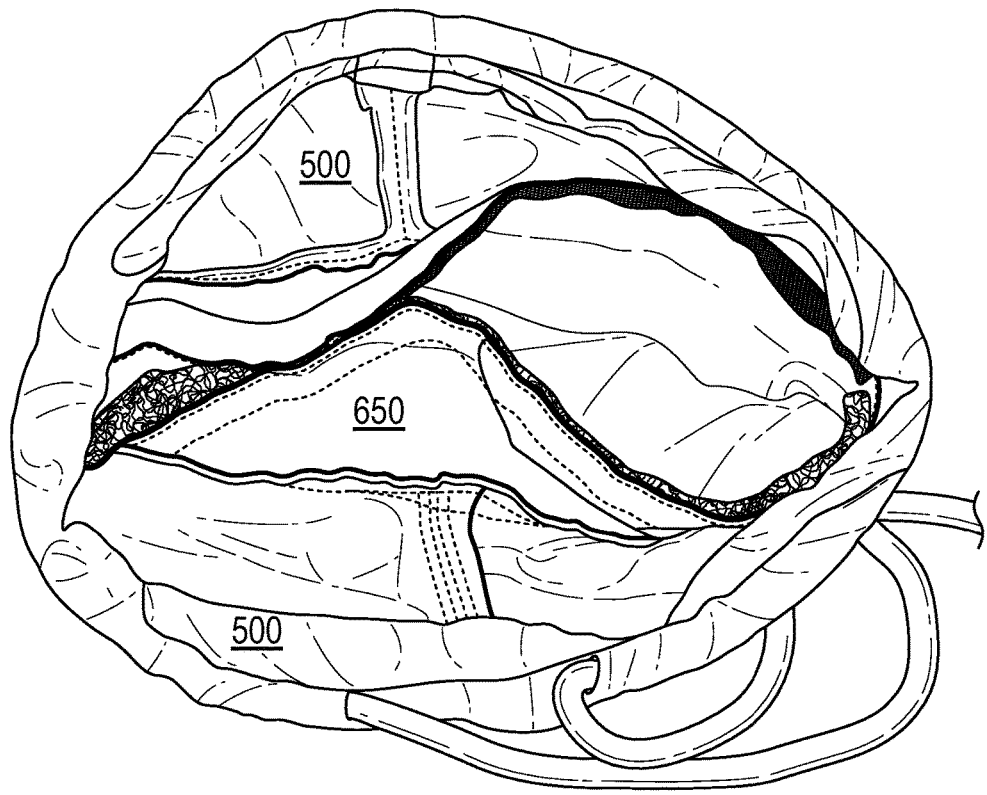
FIG. 9 depicts a top perspective view of a disclosed embodiment

FIG. 9 depicts a perspective view of top portions of a disclosed bag. Two interior closure flaps 650 are shown on the inside portions of the bag. An exterior closing sleeve 500 is disposed around the interior closure flaps.

Figure 10:
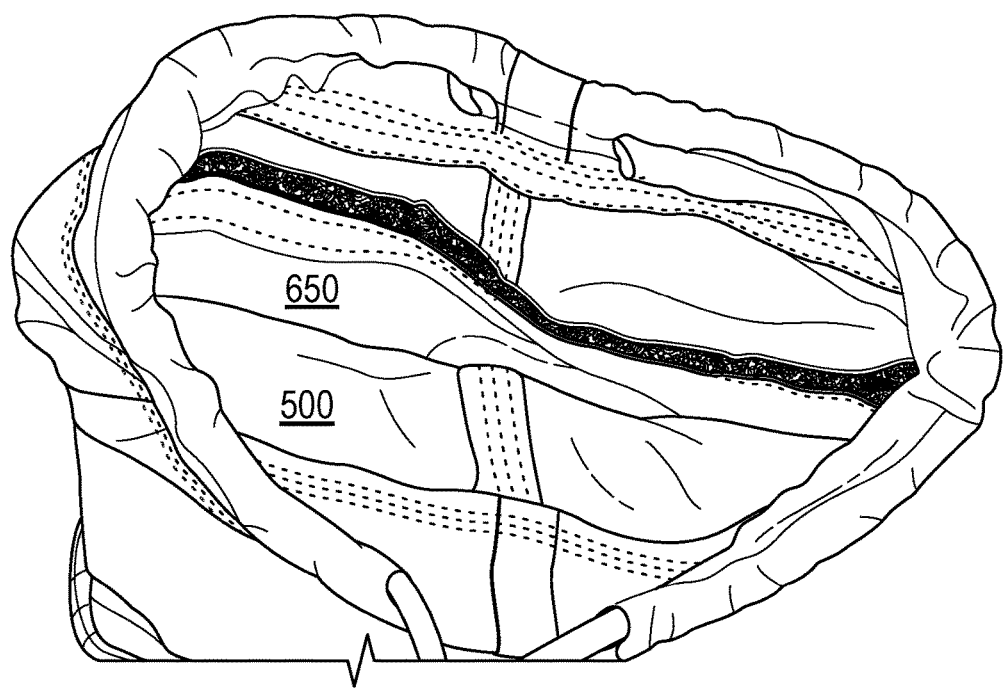
FIG. 10 depicts a top perspective view of a disclosed embodiment

FIG. 10 depicts a perspective view of interior closure flaps in a closed position.

Figure 11:
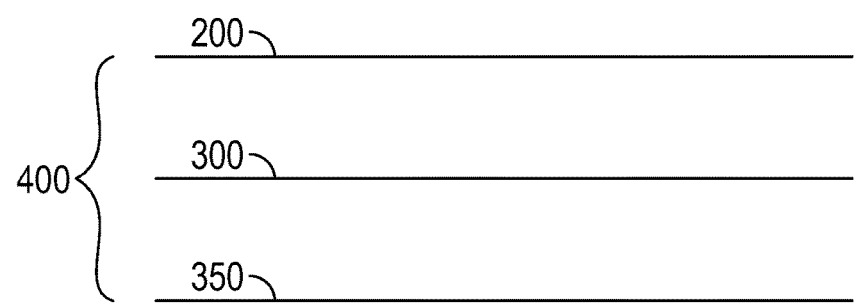
FIG. 11 depicts a disclosed fabric system

FIG. 11 depicts a disclosed main bag laminate 400 which may comprise an outer layer of pre-shrunk Spectra 200, a middle layer of EVA 300 or ethylene vinyl acetate and in inside or lower layer of Kevlar correctional grade fabric 350. Spectra may include ultra-high molecular weight polyethylene or similar material. The three layers may be secured together by baking in a temperature range of 260 to 320 degrees Fahrenheit and for a time period in the range of ten to fourteen hours.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A flexible food storage bag (100), resistant to bear and water intrusion, the bag comprising:
    a) a main bag assembly (600) comprising two pieces of main bag laminate (400), the two pieces of main bag laminate:
        (i) each having bottom ends attached together in the form of a gusset assembly (610),
        (ii) each having two sides, with the sides of each piece attached to each other by two side seams (605),
        (iii) each having top portions, with each top portion comprising an interior closure flap (650) with each interior closure flap having a top end comprising a hook and loop system (640), with each interior closure flap having a bottom end defined by a neck seam (620), the neck seam crossing the two side seams and the neck seam attaching an exterior closing sleeve (500) to the main bag assembly;
    b) the exterior closing sleeve disposed outwardly from the closure flaps and extending beyond the closure flaps, the exterior closing sleeve having a top end rolled back upon the exterior closing sleeve, with the top end of the exterior closing sleeve secured to the exterior closing sleeve by use of a cinch void seam (515), with the secured exterior closing sleeve top end defining a cinch void (510);
    c) a cord system (700) disposed within the cinch void, the cord system comprising a cord having a first end and a second end, with the first end and second end exiting the cinch void and drawn together to close the exterior closing sleeve;
    d) the exterior closing sleeve comprising polyethylene;
    e) the main bag laminate comprising:
        (i) an outer layer comprising polyethylene;
        (ii) a middle layer comprising ethylene vinyl acetate; and
        (iii) an inner layer comprising aramid fibers.

2. The flexible food storage bag of claim 1 wherein each of the two pieces of main bag laminate comprise the approximate shape of a rectangle.

3. The flexible food storage bag of claim 1 wherein the layers of the main bag laminate are secured together by baking at a temperature range of 260 to 320 degrees Fahrenheit and for a time period in the range of ten to fourteen hours.

4. The flexible food storage bag of claim 1 wherein the main bag laminate comprises:
    (i) the outer layer comprising ultra-high molecular weight polyethylene;
    (ii) the middle layer comprising ethylene vinyl acetate; and
    (iii) the inner layer comprising aromatic polyamides.

5. The flexible food storage bag of claim 1 wherein the exterior closing sleeve comprises ultra-high molecular weight polyethylene.

* * * * *